United States Patent
Uchiyama et al.

(10) Patent No.: US 8,199,491 B2
(45) Date of Patent: Jun. 12, 2012

(54) GROOVE SLIT WATER CHANNEL

(75) Inventors: Yoshiharu Uchiyama, Kanagawa-ken (JP); Akinori Uchino, Kanagawa-ken (JP); Tsutomu Chonan, Kanagawa-ken (JP); Hiroyuki Noguchi, Kanagawa-ken (JP); Kimio Kumada, Kanagawa-ken (JP)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 224 days.

(21) Appl. No.: 12/838,192

(22) Filed: Jul. 16, 2010

(65) Prior Publication Data

US 2012/0012204 A1 Jan. 19, 2012

(51) Int. Cl.
*G06F 1/16* (2006.01)
(52) U.S. Cl. ............ 361/679.55; 210/119; 165/66; 600/399
(58) Field of Classification Search ............ 210/198.1, 210/754, 119, 130; 165/42, 66, 101; 600/321, 600/399, 318; 400/490; 422/522; 4/521, 4/675; 361/679.33, 679.32, 679.4, 679.39, 361/679.55, 679.21, 679.31, 679.43, 679.57, 361/679.34
See application file for complete search history.

(56) References Cited

U.S. PATENT DOCUMENTS

| | | | |
|---|---|---|---|
| 6,443,644 B1 * | 9/2002 | Takeda et al. | 400/490 |
| 6,485,690 B1 * | 11/2002 | Pfost et al. | 422/552 |
| 6,610,944 B2 | 8/2003 | Lee et al. | |
| 8,081,445 B2 * | 12/2011 | Nakatani et al. | 361/679.55 |

FOREIGN PATENT DOCUMENTS

JP 2008-107985 A 5/2008

* cited by examiner

*Primary Examiner* — Hung Duong
(74) *Attorney, Agent, or Firm* — Shimokaji & Assoc., PC

(57) ABSTRACT

A drainage system is provided for draining liquid accidentally spilled on a casing having a plurality of pushbuttons on a surface of the casing. An electronic apparatus may comprise a casing and a drainage system. The drainage system may be connected with the casing. The drainage system may include a liquid collecting basin, a drainage exit, and a liquid passageway. The liquid passageway may have a capillary surface and may lead the liquid from the liquid collecting basin to the drainage exit.

20 Claims, 4 Drawing Sheets

GROOVE SLIT WATER CHANNEL

BACKGROUND OF THE INVENTION

The present invention relates generally to a drainage structure for a casing and, more specifically, to a drainage structure for electronic devices such as notebook computers, netbook computers, cell phones, or portable computers.

In recent years, various features are required of electronic devices, such as portable telephones and personal computers. One feature frequently demanded by consumers is a liquid drainage structure provided under the area around a pushbutton input device.

More recently, with the increasing popularity of wireless networks at coffee shops, airports, subway stations, and restaurants, people are using their laptop computers and cell phones to either surf the internet or work while also consuming beverages. In these types of environments, people may spill their coffee, tea, or soft drinks on the keyboard of their computers or on the pushbuttons of their cell phones. If there is no drainage structure or waterproof function around pushbuttons or a keyboard, liquid spills may damage the circuit boards of the electronic devices, and the operating functions of the electronic device may be impaired.

Therefore, it can be seen that there is a need for apparatus and methods for a drainage system disposed around pushbuttons or keyboards of electronic devices.

SUMMARY

In one aspect, a drainage system for a pushbutton casing comprises a liquid collecting basin operatively interfacing the casing; a drainage exit; and a liquid passageway having a capillary surface, the liquid passageway adapted to lead liquid from the liquid collecting basin to the drainage exit.

In another aspect, an electronic apparatus comprises a casing having a plurality of pushbuttons on a surface of the casing; and a drainage system adapted to receive liquid from the pushbuttons and deliver the liquid outside of the casing, the drainage system comprises a liquid collecting basin; a drainage exit; and a liquid passageway having a capillary surface, the liquid passageway adapted to lead the liquid from the liquid collecting basin to the drainage exit.

In a further aspect, a method for draining liquid permeated between a plurality of pushbuttons on a surface of a casing comprises collecting liquid that has permeated between the pushbuttons on a surface of the casing; and directing the collected liquid from a liquid collecting basin into a drainage exit through a liquid passageway; wherein the liquid passageway has a capillary surface.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide methods and systems for draining liquid on a casing having a plurality of pushbuttons. More specifically, exemplary embodiments enable the liquid that permeates between the pushbuttons on a surface of the casing to flow in a passageway to a drainage exit, thereby preventing the liquid from contacting circuit boards of the electronic apparatus. According to exemplary embodiments, a drainage system provides a liquid collecting basin, a drainage exit, and a liquid passageway, wherein the drainage passageway has a capillary surface which allows the liquid to flow from the liquid collecting basin to the drainage exit. In exemplary embodiments, the capillary surface can break the surface tension of the liquid, thus allowing liquid to flow freely. In exemplary embodiments, the casing may be an enclosure for a notebook computer and the pushbuttons may be a keyboard of the notebook computer.

Figure 1:
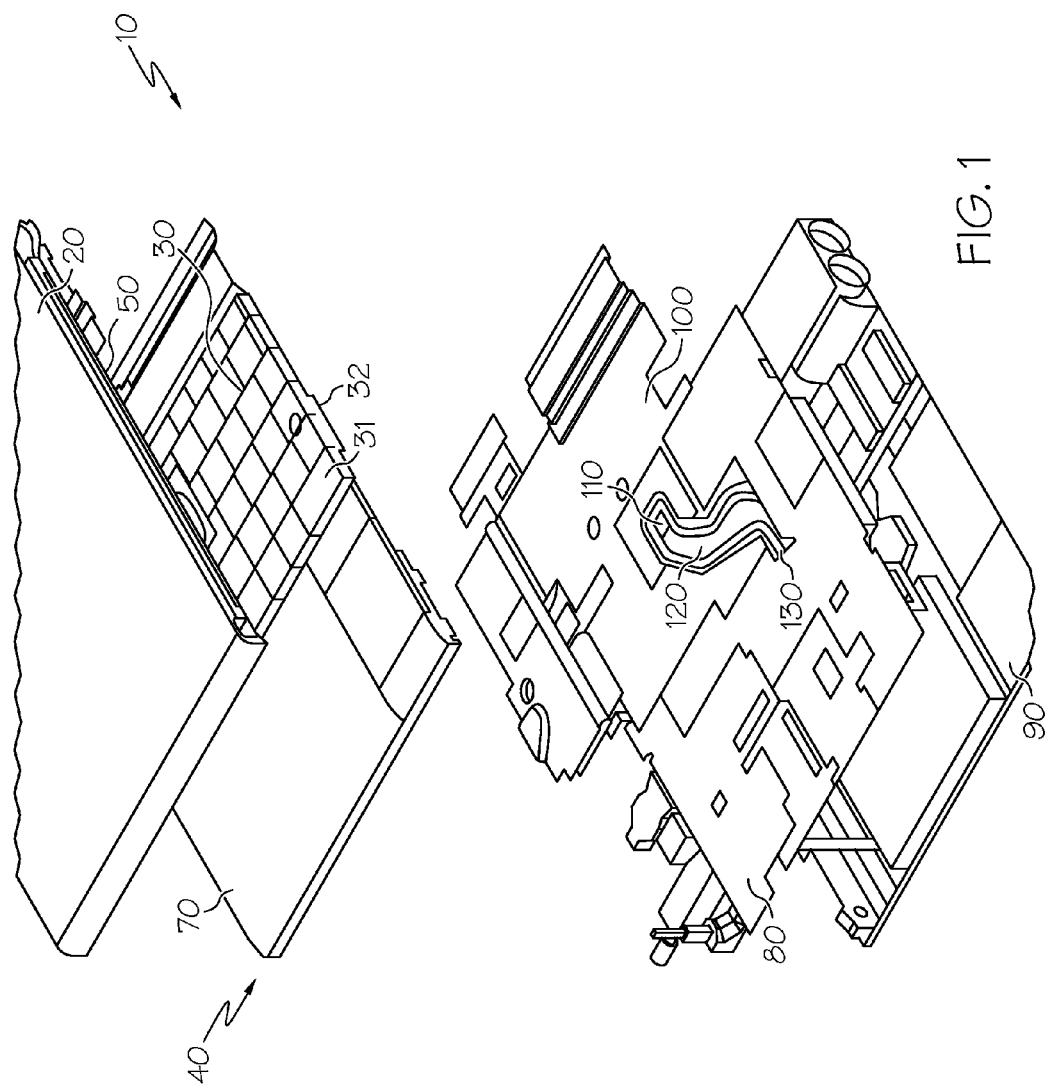
FIG. 1 is a perspective exploded view of a part of a casing and a part of a keyboard of a notebook computer according to an exemplary embodiment.
Figure 2:
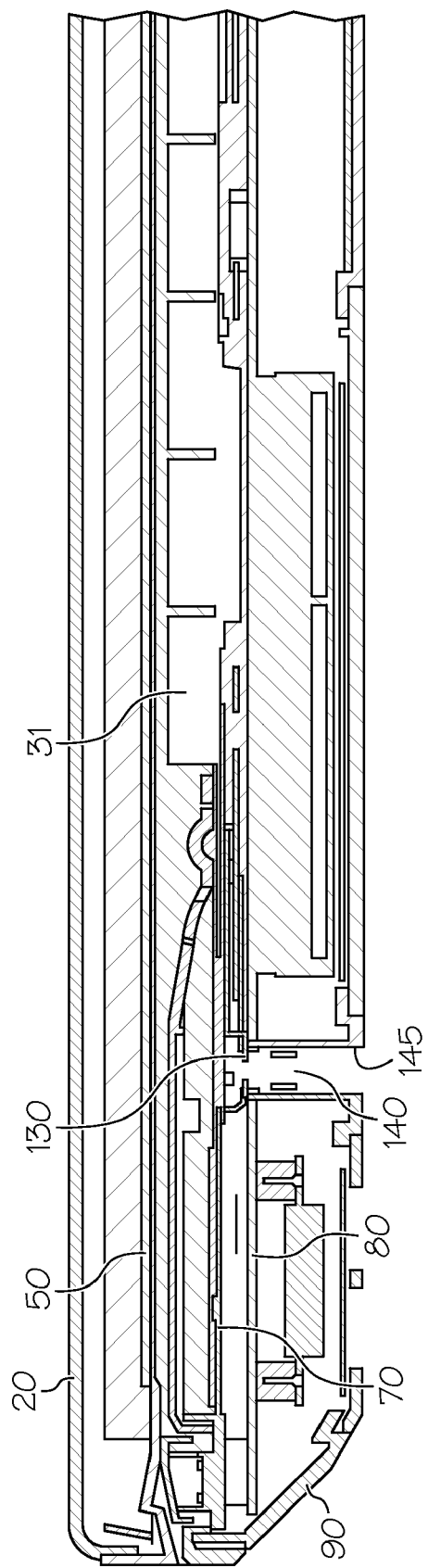
FIG. 2 is a cross sectional view of a keyboard and a casing of a notebook computer according to the exemplary embodiment shown in FIG. 1.

Referring to FIGS. 1 and 2, an electronic device 10, such as a notebook computer, may comprise a lid 20, an LCD screen 50, and a casing 40, wherein the screen 50 and the casing 40 may be integrally connected via a hinge mechanism (not shown). The keyboard 30, which may include a plurality of keys 31, may be installed on the casing 40.

The notebook computer 10 may further include a palm rest 70 and a keyboard supporting plate 100. Typically, the notebook computer 10 may use a dome-switch keyboard. The dome-switch keyboard may comprise four layers, the keyboard 30, dome-switches (not shown), a flexible circuit board (not shown), and the keyboard supporting plate 100.

The keyboard supporting plate 100 may serve to not only support the keyboard 30 in the casing 40, but also to provide a drainage system 150 for liquid that may permeate the keyboard 30, as discussed in greater detail below with reference to FIG. 4. The keyboard supporting plate 100 may be made of a water impermeable material, such as aluminum, for example. The keyboard supporting plate 100 may be connected to the keyboard 30 via pins (not shown) through pin holes (not shown). Under the keyboard supporting plate 100, a circuit board, such as a mother board 80, may be disposed within a lower case 90.

Figure 3:
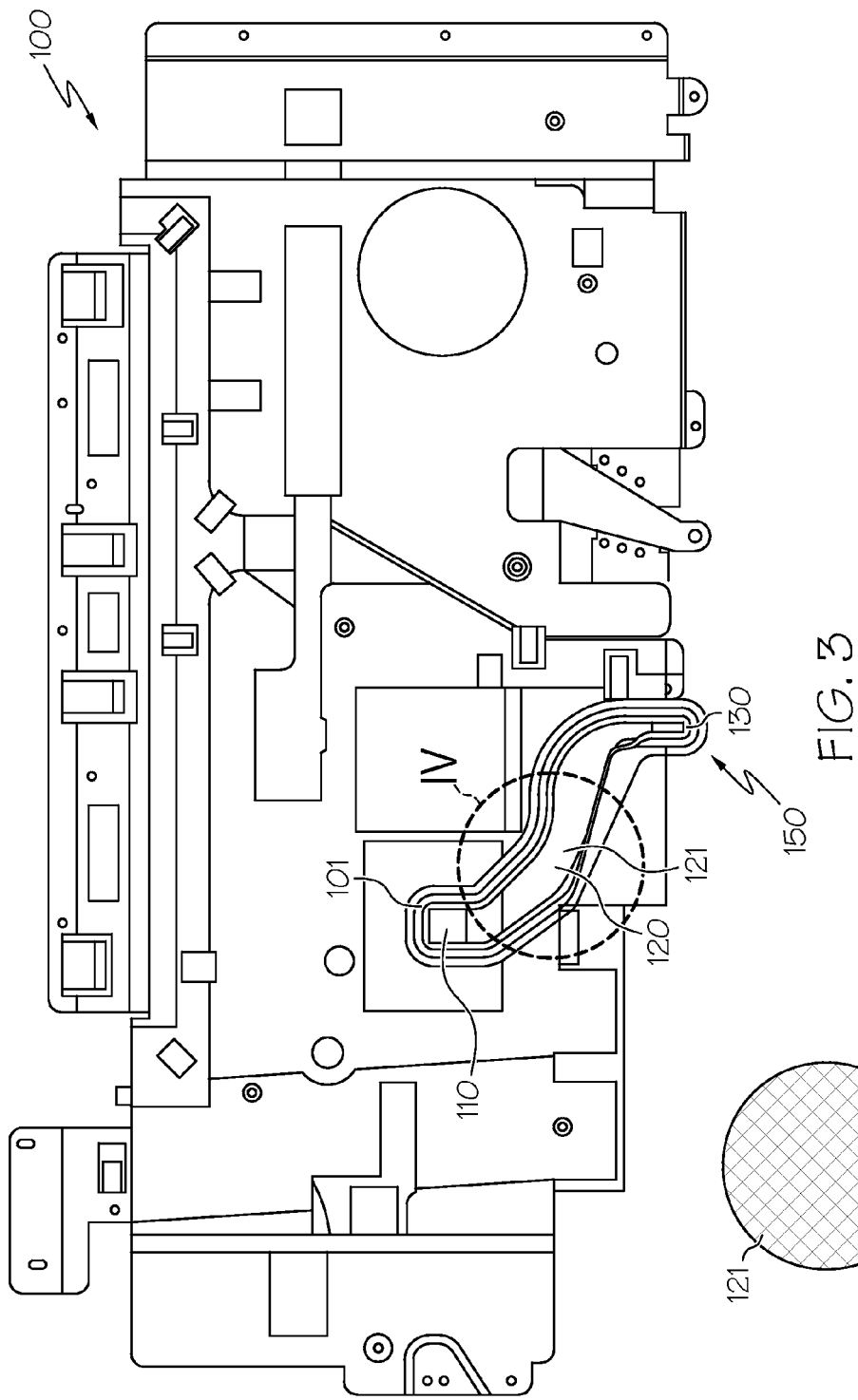
FIG. 3 is a plan view of a keyboard supporting plate with the drainage system, according to an exemplary embodiment.

Referring to FIGS. 2 and 3, an exemplary embodiment of a drainage system 150 may be disposed and situated on one part of the keyboard supporting plate 100. The drainage system 150 may include a liquid collecting basin 110, a liquid passageway 120, and a drainage exit 130. An aperture 32 (see FIG. 1) may be disposed above the liquid collecting basin 110 and under the bottom of the keyboard 30. Liquid that permeates between keys 31 of the keyboard 30 may drain through the aperture 32 to the liquid collecting basin 110.

The drainage exit 130 may include a drainage pipe 140 and an opening 145 through the lower case 90. In an exemplary embodiment, the drainage exit 130 may be disposed under the palm rest 70. The drainage pipe 140 may run through or past the mother board 80 and the lower case 90, thus preventing the liquid from contacting an electronic circuit on the mother board 80 within the casing 40. In one embodiment, the drainage pipe 140 may be perpendicular to the bottom surface of the lower case 90.

As shown in FIG. 3, the drainage system 150 may be formed integrally with the keyboard supporting plate 100. The liquid passageway 120 may slope downward from the liquid collecting basin 110 to the drainage exit 130 when the apparatus, such as the notebook computer 10, is horizontal. The liquid passageway 120 may have different shapes, such as an "L" shape or an "S" shape, for example.

The surface 121 of the liquid passageway 120 may have a capillary surface, such as a mesh-like structure. The surface 121 may be made by scratching through metal cutting work, such as with a fine pointed needle shaped scratcher. The surface of the liquid collecting basin 110 and the drainage exit 130 may also have a capillary surface.

Figure 4:
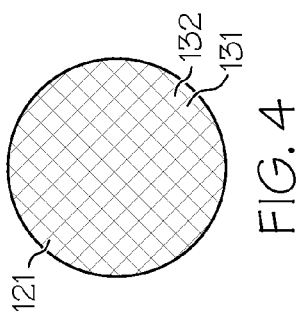
FIG. 4 is a partial, detailed view of the surface of the liquid passageway shown in a circle IV of FIG. 3.

As shown in FIG. 4, the surface 121 of the liquid passageway 120 may have a plurality of fine channels, such as channels 131 and 132. The channels 131, 132 may be cross interconnected with each other at 90 degree angles, for example. Thus, the surface 121 of the liquid passageway 120 may have edges after being scratched through metal cutting work, such as by a fine pointed needle shaped scratcher. The liquid may flow faster on the capillary surface than on a smooth surface.

Figure 5:
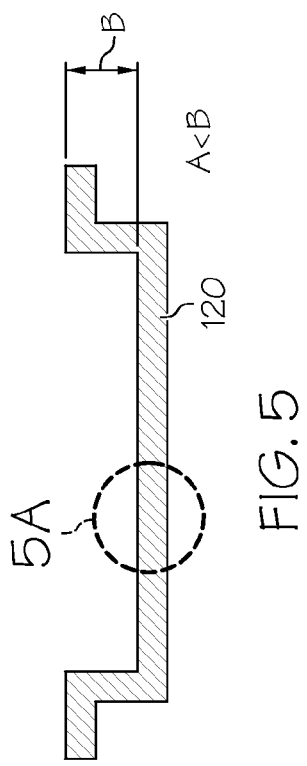
FIG. 5 is a side schematic view of a shallow tray structure according to an exemplary embodiment.
Figure 5A:
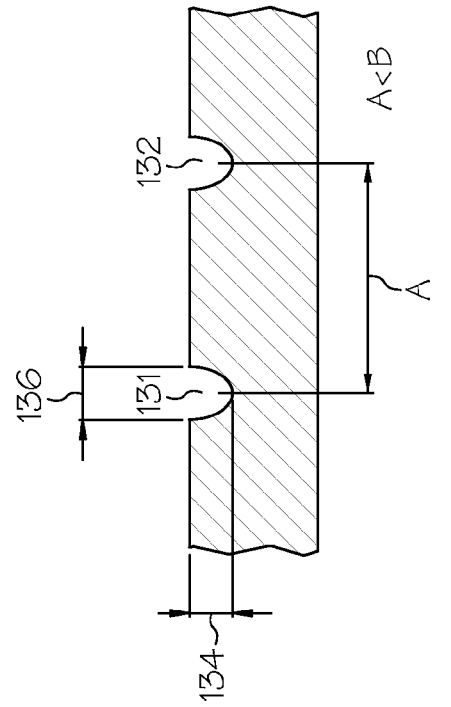
FIG. 5A is a plan schematic view of a capillary surface with channels shown in circle 5A of FIG. 5.

As shown in FIGS. 5 and 5A, the fine channels 131 or 132 may have a depth 134 from about 0.05 mm to about 0.25 mm, typically about 0.15 mm, and may have a width 136 from about 0.05 mm to about 0.25 mm, typically about 0.15 mm, for example. The distance A, between the centers of each channel 131 and 132, may be from about 1 mm to about 1.5 mm, typically about 1.25 mm. The depth B may be from about 0.05 mm to about 0.25 mm, typically about 0.15 mm. In an exemplary embodiment, the distance A may be less than the depth B of the liquid passageway 120. The fine channels 131 and 132 may help break the surface tension of the liquid, thus, helping the liquid to flow.

Figure 6:
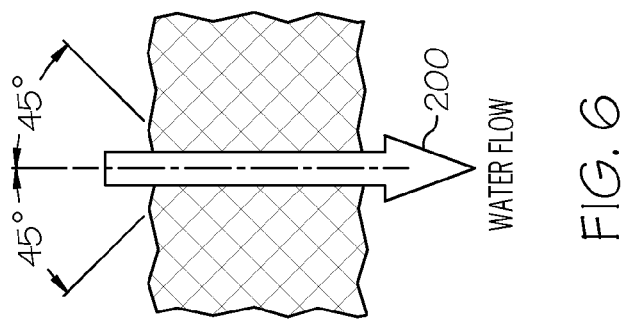
FIG. 6 is a plan schematic view of a capillary surface with channels and water flow direction, according to an exemplary embodiment.

In operation, the liquid collecting basin 110 may collect liquid that has permeated between the keys 31. With the help of the capillary surface 121, the liquid may move from the liquid collecting basin 110 into the drainage exit 130 when the electronic apparatus, such as a laptop computer, is substantially horizontal. The liquid may be discharged outside of the lower case 90 at the opening 150 through the drainage pipe 140. As shown in FIG. 6, the channels 131, 132 may be fabricated to be disposed, as an example, at an angle of about 45 degrees relative to the direction 200 of at least a portion of the flow of the liquid. The direction 200 of the liquid flow may change depending on the shapes of the drainage system.

It should be understood, of course, that the foregoing relate to exemplary embodiments of the invention and that modifications may be made without departing from the spirit and scope of the invention as set forth in the following claims.

We claim:

1. A drainage system for a pushbutton casing, comprising:
a liquid collecting basin operatively interfacing the casing;
a drainage exit; and
a liquid passageway having a capillary surface, the liquid passageway adapted to lead liquid from the liquid collecting basin to the drainage exit.

2. The drainage system of claim 1, wherein the liquid collecting basin is adapted to receive liquid from an aperture disposed above the liquid collecting basin and under an area around the pushbuttons where liquid that permeates between the pushbuttons may drain through the aperture to the liquid collecting basin.

3. The drainage system of claim 1, wherein the capillary surface has a plurality of channels.

4. The drainage system of claim 3, wherein the distance between the centers of each channel is less than the depth of the liquid passageway.

5. The drainage system of claim 3, wherein the channels are disposed at an angle of 45 degrees relative to the direction of at least a portion of the flow of the liquid.

6. The drainage system of claim 1, wherein the drainage system further comprises a drainage pipe adapted to discharge the liquid to the outside of an electronic apparatus.

7. The drainage system of claim 6, wherein the drainage pipe is perpendicular to a bottom surface of the electronic apparatus.

8. The drainage system of claim 1, wherein the liquid collecting basin further comprises a capillary surface.

9. An electronic apparatus, comprising:
a casing having a plurality of pushbuttons on a surface of the casing; and
a drainage system adapted to receive liquid that permeates through the pushbuttons, the drainage system comprising:
a liquid collecting basin;
a drainage exit; and
a liquid passageway having a capillary surface, the liquid passageway adapted to lead liquid from the liquid collecting basin to the drainage exit.

10. The electronic apparatus of claim 9, wherein the pushbutton supporting plate is made of a water impermeable material.

11. The electronic apparatus of claim 9, wherein the pushbutton supporting plate is made of aluminum.

12. The electronic apparatus of claim 9, wherein the liquid passageway slopes downward from the liquid collecting basin to the drainage exit when the electronic apparatus rests on a horizontal surface.

13. The electronic apparatus of claim 9, wherein the capillary surface is a mesh-like surface.

14. The electronic apparatus of claim 13, wherein the mesh-like surface has a plurality of channels.

15. The electronic apparatus of claim 14, wherein the distance between the centers of each adjacent channel is less than the depth of the liquid passageway.

16. A method for draining liquid permeated between a plurality of pushbuttons on a surface of a casing, comprising:
collecting liquid that has permeated between the pushbuttons on a surface of the casing; and
directing the collected liquid from a liquid collecting basin into a drainage exit through a liquid passageway;
wherein the liquid passageway has a capillary surface.

17. The method of claim 16, further comprising preventing the liquid from contacting an electronic circuit within the casing.

18. The method of claim 16, further comprising moving the liquid substantially horizontally on a downward slope from the liquid collecting basin into the drainage exit.

19. The method of claim 16, further comprising preventing air from blocking the liquid flow.

20. The method of claim 16, further comprising breaking surface tension of the liquid.

* * * * *